May 1, 1951    L. A. DICKENS    2,551,249
SPEED REGULATING HYDRAULIC CLUTCH
Filed March 26, 1946    3 Sheets-Sheet 1
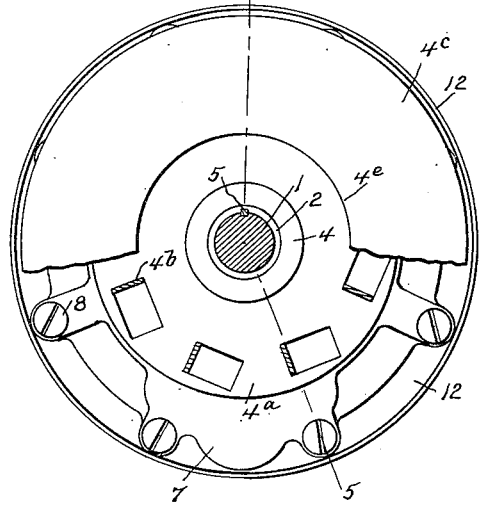
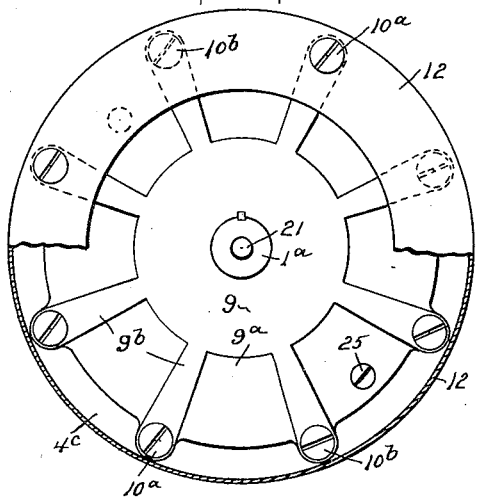
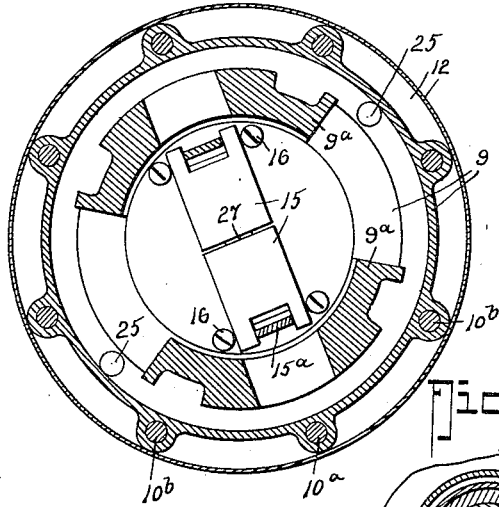
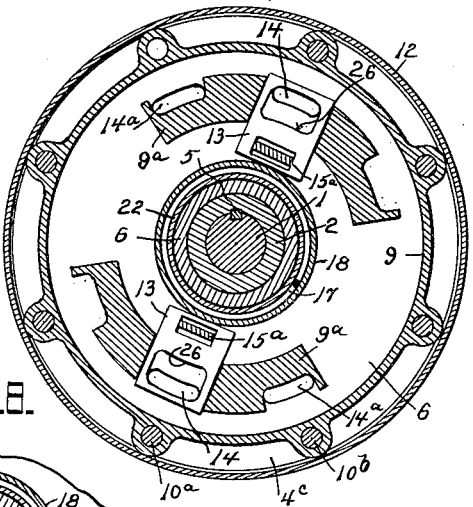
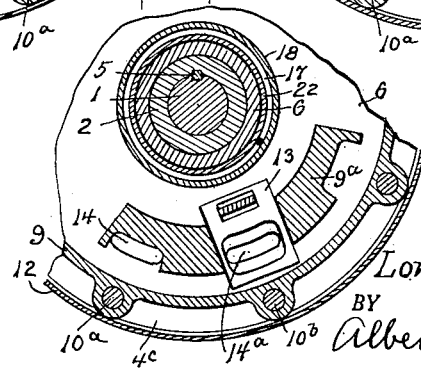
INVENTOR,
Lonnie A. Dickens,
BY
Albert E. Dieterich
ATTORNEY.

May 1, 1951 L. A. DICKENS 2,551,249
SPEED REGULATING HYDRAULIC CLUTCH
Filed March 26, 1946 3 Sheets-Sheet 2

INVENTOR,
Lonnie A. Dickens,
BY
Albert E. Dieterich,
ATTORNEY.

May 1, 1951  L. A. DICKENS  2,551,249
SPEED REGULATING HYDRAULIC CLUTCH
Filed March 26, 1946  3 Sheets-Sheet 3
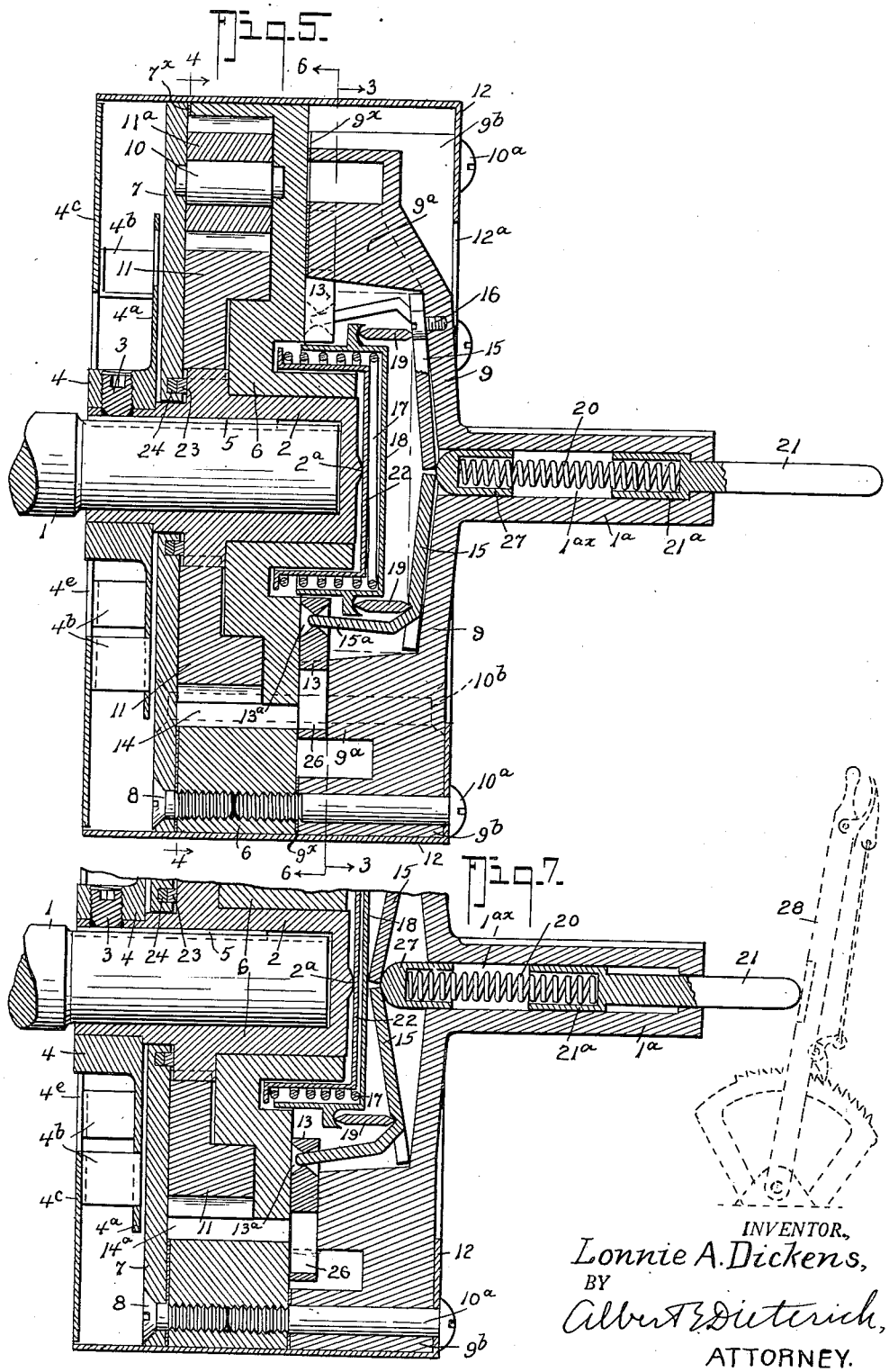
INVENTOR,
Lonnie A. Dickens,
BY
Albert E. Dieterich,
ATTORNEY.

Patented May 1, 1951

2,551,249

UNITED STATES PATENT OFFICE 2,551,249

SPEED REGULATING HYDRAULIC CLUTCH

Lonnie A. Dickens, High Point, N. C.

Application March 26, 1946, Serial No. 657,103

8 Claims. (Cl. 192—61)

My invention has for its objects:

1. To provide means to stop and start a driven load without altering the speed or stopping and starting the prime mover.

2. To provide means to slowly bring a machine to speed as in the case of printing presses for example.

3. To provide means to accomplish the above objects by simple, inexpensive means which will not wear out quickly when used constantly.

4. To provide means to accomplish the above objects, which means can be adjusted while in motion to operate at any speed from full speed of the driver gradually down to a complete stop, a means which will "slip" constantly so as to run at its selected speed without wearing unduly or overheating and will maintain evenly the selected speed for the driven unit even though the speed of the driving unit may vary.

Other objects will in part be obvious and in part be pointed out hereinafter.

To the attainment of the aforesaid objects and ends invention further resides in those novel details of construction, combinations, and arrangements of parts all of which will first be fully described and then be specifically pointed out in the appended claims, reference being had to the accompanying drawings in which:

Fig. 1 is an elevational view of the clutch looking at the prime mover or "driving" side, parts being broken away.

Fig. 2 is a similar view looking at the other or "driven" side.

Fig. 3 is a vertical section on the line 3—3 of Fig. 5 looking in the direction of the arrow.

Fig. 5 is a vertical section on the line 5—5 of Fig. 1.

Fig. 6 is a vertical section on the line 3—3 of Fig. 5 looking in the direction opposite that of the arrow.

Fig. 7 is a detail section of a portion of the clutch showing the mechanism in an operating position different from that shown in Fig. 5.

Fig. 8 is a detail section of a portion of the clutch in a position of the parts to operate the clutch in a direction opposite that shown in Fig. 6, and with the adjustment of the valves as shown in Fig. 7.

Figure 4:
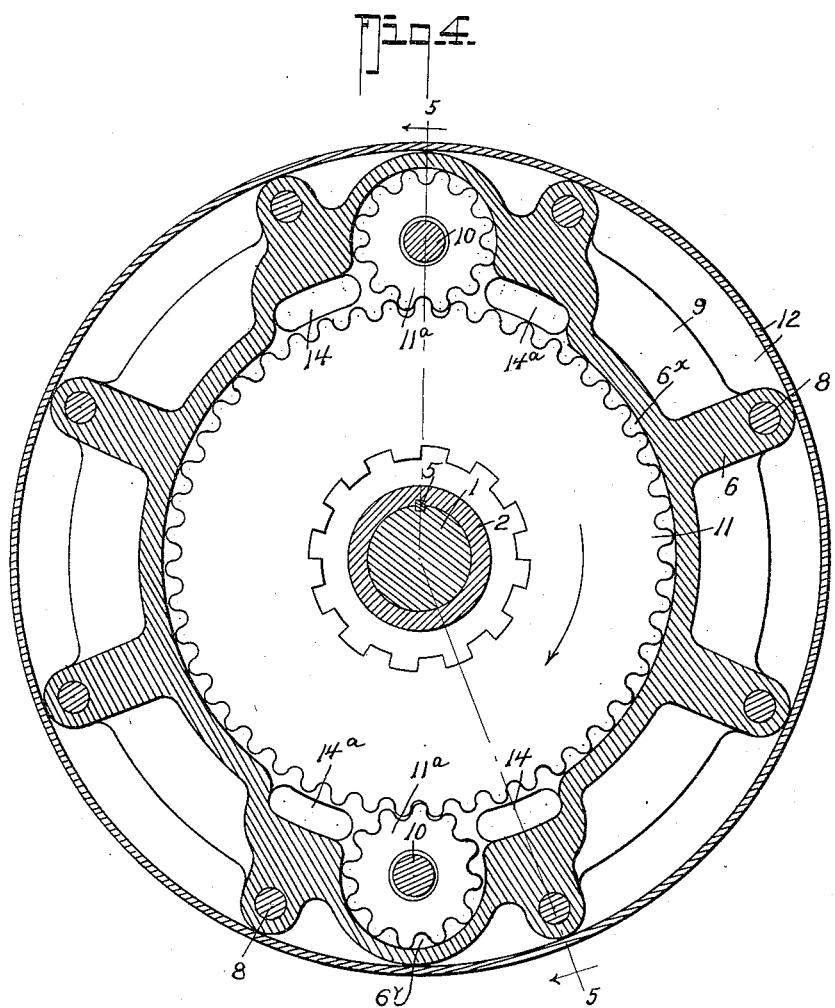
Fig. 4 is a vertical section on the line 4—4 of Fig. 5.

In the drawings in which like numerals and letters of reference indicate like parts in all the figures, 1 indicates a prime mover shaft on which the clutch is mounted in a conventional manner as by a key 5 and set screw 3, the shaft 1 projecting into the hub 2 on which is also secured, by the set screw 3, the fan hub 4. The hub 2 has a spherical or convex projection $2^a$ on its end to effect a point engagement with a spring cup 22 later again referred to. Stamped from the fan disc $4^a$ are vanes $4^b$ which are suitably secured to the baffle plate or disc $4^c$.

The clutch body 6 is chambered as at $6^x$ and $6^y$ for the master gear 11 and the two diagrammetrically opposite smaller gears $11^a$ which gears constitute with the body 6 and its cover 7, a pump device. The cover 7 is secured to the clutch body 6 by screws 8. The gears $11^a$ rotate on pins 10 and mesh with the gear 11 which is keyed to the hub 2 and rotates with it. A cover 9 is also attached to the body 6 on the side opposite that to which the plate 7 is secured. The cover 9 is fastened to the body 6 by screws $10^a$, $10^b$. Thin gaskets $7^x$—$9^x$ are used between plate 7 and body 6 and between cover 9 and body 6 to form a liquid tight joint. The cover 9 has a shaft portion $1^a$ upon which a gear or pulley (not shown) connected to the driven load is to be mounted.

The cover 9 is provided with projections $9^a$ which serve as guides for sliding valves 13 and for liquid passing through ports 14 and $14^a$ with which the valve ports 26 register. These ports are openings in the body 6. Levers 15 pass through openings $13^a$ in the valves 13 to control the valves. The levers 15 pivot against the corners where the projections $9^a$ join the body 9 and are held in the proper relationship to the cover 9 by screws 16 that are threaded into the cover 9 at each side of the levers (see Figs. 3 and 5).

A spring 17 which lies between the spring cup 22 and a second spring cup 18 exerts pressure against cup 18 which, through two pivots 19 holds the levers 15 firmly against the pivot points of the cover 9, between the screws 16. As the pressure of the spring 17 transmitted against the levers 15 tends to force them against the cover 9 through their entire length, the portions $15^a$ of the levers which pass through the valves 13 are drawn toward the axis of the shaft 1 carrying the valves with them. The pressure against the levers 15 from the spring 17 acting through pivots 19 is in part counteracted by pressure against the opposite side of the levers, induced by a spring 20 operating between cups $21^a$ and 27, located in a bore $1^{ax}$ in the driven or auxiliary shaft $1^a$. The tension of spring 20 may be adjusted by forcing the pin 21 (which extends through a reduced part of the bore $1^{ax}$ to the outside of the shaft $1^a$) inwardly by any suitable means, as for example, a lever device 28 shown in dotted line in Fig. 7.

The place of contact $2^a$ of the spring cup 22 with the hub 2 serves both as a bearing point for the cup 22 and as a means through which the hub 2 is held firmly against a washer 23 which is seated in a groove in the plate 7 together with a resilient or pliable gasket 24, forming a liquid tight seal between the hub 2 and the plate 7.

Apertures with closure plugs 25 are provided at diametrically opposite places in the cover 9 through which oil may be added or removed from the interior of the clutch assembly. All open space within the structure is to be filled with non-foaming oil. The plugs 25 are accessible when the screws 10a are removed and the housing 12 is drawn off the assembly.

The housing 12 passes over the assembly of body 6, plate 7 and cover 9 and is held in place by the screws 10a which pass through the housing and the cover 9 and are threaded into the body 6.

Operation

When the driving unit begins to turn shaft 1, gear 11 is turned with it. Assuming that shaft 1 is revolving in the direction indicated by the arrow on gear 11 in Fig. 4, the oil within the clutch assembly is drawn into the gear compartment through the ports 14a and is carried in the spaces between the teeth of the gears, and is discharged from the gear compartment through the ports 14. The oil passes from the ports 14 into the ports 26 of the valves 13. With the valves withdrawn toward the clutch axis (Figs. 5 and 6) there is no exit for oil from the valve ports 26. Consequently the oil which is discharged by the three gears cannot escape and therefore the gears which function as a double oil pump "lock up." As these gears "lock" the entire clutch assembly will begin to turn with gear 11 and with shaft 1 of the prime mover (not shown). Thus the load driven through shaft 1a will be rotated.

As the clutch begins to turn the valves 13 will be thrown toward the perimeter by centrifugal force. As the valves thus move outwardly the ports 26 will pass beyond the outer edge of the projections 9a, thus providing exits for oil discharged through the ports 14. This permits the gears to turn about their axes within the housing. As the gear 11 rotates within the assembly it is the equivalent of the clutch assembly "slipping" on shaft 1 and when this "slip" is sufficient to cause the clutch to slow down the valves 13 will no longer be thrown toward the axis by the action of the spring 17.

When the valves 13 are moved nearer the perimeter a larger exit for oil will be provided and as a consequence the clutch "slips" more but as the valves are drawn toward the axis less exit is available; consequently there is less "slip." The valves will settle on the position where their centrifugal force balances with the force exerted by the spring 17.

The force exerted by the spring 17 is sufficient to hold the valves 13 in their in or closed position when the clutch assembly is operating at full speed, but the centrifugal force exerted on the valves is supplemented by the force of the spring 20. The tension of the spring 20 is adjustable while the clutch is in motion by forcing in pin 21. Therefore the force which supplements the centrifugal force on the valves 13 may be altered to vary the speed at which the valves 13 will be "thrown out" to permit the clutch to "slip."

The spring cup 27 serves as a contact for spring 20 against the levers 15 and also serves to keep the levers in alignment, thereby causing the valves 13 to move simultaneously to allow the same oil exit at each side of the clutch. This also serves to keep the assembly in balance as each of the valves 13 is equi-distant from the axis of the clutch.

As before noted the spring 17 is sufficiently strong so as to keep the valves 13 closed at top speed. However, as the tension on the spring 20 is increased its force counteracts that of spring 17 and permits valves 13 to be thrown out at a progressively lower speed as pin 21 is forced in. When the pin 21 is completely in, the edge of its cup 21a contacts the cup 27 and forces cup 27 in against the levers 15 thereby holding the valves 13 open even in idle position. This allows the oil pumped from the gears an outlet and permits the clutch to "slip" as no energy is transmitted to the load except through the internal friction of the clutch assembly which is insufficient to carry the load. It will be further noted that the ports 26 of the valves 13 are large enough to cover the ports 14, 14a regardless of the position of the valves 13. This is to prevent a side thrust against the valves by the outrushing oil and will cause the oil pressure to balance within the slots 26 and thus prevent interference with the free movement of the valves.

As the oil is discharged through the ports 26 from the ports 14 it moves out against the perimeter of the cover 9 and passes around to the ports 14a where it again passes into the gear chamber. If the clutch assembly is not entirely full of oil the portion that is within will be thrown evenly against the perimeter of the cover 9 by centrifugal force, thus balancing the assembly and also putting the available oil in position to enter ports 14a.

When the clutch is "slipping" the oil will be heated by friction and as it circulates the heat will be transmitted to the body 6 and the cover 9. The amount of heat generated is proportional to the amount of "slip" of the clutch. The clutch assembly is air cooled and the amount of air circulated is controlled in a novel way to vary the quantity in proportion to the need for cooling and operates as follows: When the clutch assembly is idle but shaft 1 is turning, the fan 4a, which is fastened to the hub 4, turns with shaft 1. Fan 4a is made of a thin metal disc with vanes 4b folded out from it. To the outside end of the vanes 4b another disc 4c is welded. This assembly, parts 4, 4a, 4b, 4c will hereinafter be referred to as the first fan. As the fan rotates it draws air in through the center opening 4* in disc 4c and forces air through the spaces provided between the bosses, for the screws 8, 10a and 10b, of the body 6, plate 7 and cover 9, which spaces are enclosed by the housing 12. As the air passes through these spaces it cools the housing 12 and its contents and is discharged from the clutch assembly at the side opposite the first fan through the opening 12a provided in the center of the housing 12 around shaft 1a. The passage to opening 12a is broken up into parts by the extensions of the screw bosses or cover projections 9b. These extensions become air vanes. As the clutch assembly turns the vanes 9b also become a centrifugal air fan (hereinafter referred to as the second fan) and as the speed of the clutch accelerates the pressure exerted by the air from vanes 9b also accelerates, gradually counteracting the pressure exerted on the opposite side of the clutch by the first fan until at full speed of the clutch, when no cooling air is needed, the pressure exerted by the respective fans will practically balance one another and little or no air is circulated through the housing 12.

From the foregoing description and from the drawings it will be noted that this clutch will only function in one direction, because if its operation were reversed oil would be discharged through the ports 14ª instead of ports 14 and as ports 14ª are not obstructed the oil could be constantly discharged through the ports 14ª and the clutch would "slip" constantly when operating in reverse. This action is novel and useful for a number of applications.

If it is desired that this clutch be operated in the opposite direction, housing 12 may be removed after removing screws 10ª; after the oil has been drained by removing the plugs 25 screws 10ᵇ may also be removed, thus permitting cover 9 to be turned on body 6 one-eighth turn until the next screw holes line up with the holes in the cover and the valves 13 line up with the ports 14ª instead of with the ports 14. Then screws 10ᵇ, oil, plugs 25 and housing 12 are replaced. Assembled in this manner the clutch will operate in the opposite direction but in the same manner as before since the only change will be that valves 13 will control ports 14ª instead of ports 14. Fig. 8 shows a portion of the clutch section as shown in Fig. 6 except that the parts are in the afore-mentioned reversed position and also the valve 13 is shown in the open position.

Fig. 7 also shows the valve 13 and its control mechanism in the open position in which position the clutch "slips." In Fig. 7 the pin 21 is shown forced in part of the way thereby reducing the operating speed of the clutch.

Although the oil pumping mechanism of this clutch is illustrated as a gear type pump it could also be a vane or a turbine type pump without changing the other mechanism or the operation of this and be within the scope of my invention as defined in the appended claims.

From the foregoing description taken in connection with the accompanying drawings it is thought that the construction, operation and advantages of my invention will be clear to those skilled in the art.

What I claim is:

1. A speed regulating hydraulic clutch which includes: a chambered freely rotatable clutch body having liquid inlet and outlet ports; pumping elements in the chamber of said body for circulating liquid through said body and including a driving element having means for its connection to the shaft of a prime mover; a cover secured to said clutch body and having a chamber for connection with said inlet and outlet ports, said cover having a driven shaft and having valve-guiding projections; slide valves guided by said projections to cooperate with said outlet ports; means continuously urging said valves to close off said outlet ports, said valves being moved to open said outlet ports by the direct action of centrifugal force on said valves on rotation of said clutch body; and adjustable means to augment the action of centrifugal force at the will of an operator, said valves having ports of greater cross-sectional areas than those of the outlet ports of said clutch body for preventing side thrust against the valves by outrushing oil when the ports are open.

2. A speed regulating hydraulic clutch which includes: a chambered freely rotatable clutch body having liquid inlet and outlet ports and a cover plate; pumping elements in the chamber of said body for circulating liquid through said body and including a driving element having means for its connection to the shaft of a prime mover; a cover secured to said clutch body and having a chamber for connection with said inlet and outlet ports, said cover having a driven shaft and having valve-guiding projections; slide valves guided by said projections to cooperate with said outlet ports; said driving element including a hub on which said clutch body is rotatably mounted; a liquid seal packing between said hub and said clutch-body cover plate; means continuously urging said valves to close off said outlet ports and to hold said liquid seal packing in sealing contact with said hub and said cover plate; said valves being moved to open said outlet ports by centrifugal force on rotation of said body and cover.

3. The clutch of claim 2 wherein said continuously urging means includes a spring cup engaging the inner end of said hub, a spring over said cup and a second cup over said spring, the spring tending to separate said cups along their common axis, and an operative connection between said second mentioned spring cup and said valves for moving said valves toward their port-closing position.

4. The clutch of claim 1 wherein is provided means for augmenting the action of centrifugal force on said valves at will.

5. The clutch of claim 1 wherein the valve urging means includes a pair of levers connected to said valve, and a spring continuously tending to actuate said levers to cause said valve to move to a closed position.

6. The clutch of claim 1 wherein the valve urging means includes a pair of levers connected to said valve, a spring continuously tending to actuate said levers to cause said valve to move to a closed position, and means operable through said driven shaft for reducing the effective action of said spring at will.

7. The clutch of claim 2 wherein said continuously urging means includes a spring cup engaging the inner end of said hub, a spring over said cup and a second cup over said spring, the spring tending to separate said cups along their common axis, and an operative connection between said second mentioned spring cup and said valves for moving said valves toward their port-closing position, said operative connection comprising levers, pivots operatively connecting said levers and the second mentioned spring cup, said levers having projections and said valves having holes to receive said projections by virtue of all of which when said levers are rocked on their pivots said valves will be operated accordingly.

8. The clutch of claim 2 wherein said continuously urging means includes a spring cup engaging the inner end of said hub, a spring over said cup and a second cup over said spring, the spring tending to separate said cups along their common axis, and an operative connection between said second mentioned spring cup and said valves for moving said valves toward their port-closing position, said operative connection comprising levers, pivots operatively connecting said levers and the second mentioned spring cup, said levers having projections and said valves having holes to receive said projections by virtue of all of which when said levers are rocked on their pivots said valves will be operated accordingly; a spring operatively engaging both levers and continuously tending to augment the centrifugal force acting on said valves, and means for varying the force of the last named spring at will.

LONNIE A. DICKENS.

REFERENCES CITED

The following references are of record in the file of this patent:

UNITED STATES PATENTS

| Number | Name | Date |
|---|---|---|
| 1,515,401 | Norris | Nov. 11, 1924 |
| 1,688,852 | Christie | Oct. 23, 1928 |
| 1,786,356 | McFarland | Dec. 23, 1930 |
| 2,034,702 | McClelland | Mar. 24, 1936 |
| 2,050,836 | Graham | Aug. 11, 1936 |
| 2,076,887 | Gambrell | Apr. 13, 1937 |
| 2,195,901 | Owens | Apr. 2, 1940 |
| 2,241,241 | Clouse | May 6, 1941 |
| 2,241,242 | Friedman | May 6, 1941 |

FOREIGN PATENTS

| Number | Country | Date |
|---|---|---|
| 228,911 | Great Britain | Jan. 14, 1926 |